US005083023A

United States Patent [19]

Miyagawa

[11] Patent Number: 5,083,023

[45] Date of Patent: Jan. 21, 1992

[54] COMPOSITE LIGHT SOURCE UNIT AND SCANNING DEVICE

[75] Inventor: Ichirou Miyagawa, Kanagawa, Japan

[73] Assignee: Fuji Photo Film Co., Ltd., Kanagawa, Japan

[21] Appl. No.: 408,005

[22] Filed: Sep. 15, 1989

[30] Foreign Application Priority Data

Sep. 16, 1988 [JP] Japan ............................. 63-231841
Sep. 16, 1988 [JP] Japan ............................. 63-231842

[51] Int. Cl.[5] ..................... A61B 6/00; G01N 23/04
[52] U.S. Cl. .......................... 250/327.2; 250/484.1
[58] Field of Search ............... 250/327.2 B, 327.2 D, 250/327.22, 484.1 B; 369/122, 121

[56] References Cited

U.S. PATENT DOCUMENTS 4,085,423 4/1978 Tsunoda et al. .................. 369/122
4,258,264 3/1981 Kotera et al. .
4,276,473 6/1981 Kato et al. .
4,315,318 2/1982 Kato et al. .
4,387,428 6/1983 Ishida et al. .
4,655,590 4/1987 Aagano et al. ...................... 356/72
4,976,527 12/1990 Horikawa et al. ................. 350/588

FOREIGN PATENT DOCUMENTS 56-11395 2/1981 Japan .

*Primary Examiner*—Jack I. Berman
*Assistant Examiner*—Richard Hanig
*Attorney, Agent, or Firm*—Sughrue, Mion, Zinn, Macpeak & Seas

[57] ABSTRACT

A composite light source unit including a plurality of semiconductor lasers disposed in a housing, a plurality of collimator optical systems for converting the laser beams to parallel laser beams, respectively, and a combining optical system for combining all the laser beams except one as a group of laser beams having close, parallel optical axes, respectively, extending in a direction different from the direction of said one laser beam, whereby said one laser beam and the group of laser beams are emitted from the housing in different directions. Alternatively, the combining optical system combines the laser beams as a group of laser beams having close, parallel optical axes, respectively, and emits the group of laser beams out of the housing, one of the laser beams emitted out of the housing having a different optical property than that of the other laser beams. Said one laser beam can easily be separated from the other laser beams, and will be used as a synchronizing beam in a scanning device.

21 Claims, 4 Drawing Sheets

COMPOSITE LIGHT SOURCE UNIT AND SCANNING DEVICE

BACKGROUND OF THE INVENTION

1. Field of the Invention

The present invention relates to a scanning device for use in reading and recording an image, and a composite light source unit comprising a number of semiconductor lasers, for use in such a scanning device.

2. Description of the Prior Art

There are known image information reading apparatus in which a sheet with image information recorded thereon is two-dimensionally scanned by a light beam, such as a laser beam, and light containing the image information (which is reflected from, transmitted through, or emitted by the sheet upon exposure to the scanning light beam) is detected by a light detector means including a multiplier phototube, or the like, so that the image information recorded on the sheet can be read out. Such image information reading apparatus have widely been employed as input devices for platemaking scanners, computers, and facsimile machines.

When a certain type of phosphor is exposed to radiation such as X-rays, α-rays, β-rays, γ-rays, cathode rays, or ultraviolet rays, for example, that phosphor stores a part of the energy of the radiation. When the phosphor exposed to the radiation is subsequently exposed to stimulating rays such as visible light, the phosphor emits light in proportion to the stored energy. Phosphor exhibiting such a property is referred to as a "stimulable phosphor". There have been proposed radiation image information recording and reproducing systems (see U.S. Pat. Nos. 4,258,264, 4,315,318, 4,387,428, 4,276,473 and Japanese Unexamined Patent Publications No. 56(1981)-11395, for example). In such a system, the radiation image information of an object such as a human body is stored on a sheet having a layer of stimulable phosphor, and then the stimulable phosphor sheet is scanned with stimulating rays such as a laser beam to cause the stimulable phosphor sheet to emit light representative of the radiation image. The emitted light is then photoelectrically detected to produce an image information signal that is electrically processed for generating image information. The generated image information is recorded as a visible image on a recording medium such as a photosensitive material or displayed as a visible image on a CRT or the like.

The radiation image information recording and reproducing system includes an image reading apparatus for reading image information from a stimulable phosphor sheet on which the image information is recorded. More specifically, the stimulable phosphor sheet is scanned by a deflected stimulating light beam in a main scanning direction, while at the same time the stimulable phosphor sheet is moved relatively to the stimulating light beam in an auxiliary scanning direction perpendicular to the main scanning direction. As a consequence, the stimulable phosphor is scanned two-dimensionally by the stimulating light beam. Light emitted from the stimulable phosphor sheet in response to the applied stimulating light beam is photoelectrically detected by a light detector, which then produces an image signal indicative of the image information.

The radiation image information recording and reproducing system also has an image recording apparatus. In the image recording apparatus, the image information thus read by the image information reading device is reproduced and recorded as a visible image on a recording sheet by scanning the recording sheet in a main scanning direction with a light beam which is modulated by the image signal. While the recording sheet is being thus scanned in the main scanning direction, it is also moved in an auxiliary scanning direction with respect to the modulated light beam.

Each of the image reading and recording apparatus includes a scanning device for deflecting the light beam in the main scanning direction. Employing a semiconductor laser as the light source for generating the scanning light beam in the light scanning device is well known. The semiconductor laser is smaller, less expensive, and has a smaller electric power requirement than gas lasers. The output laser beam of the semiconductor laser can be varied by controlling a drive current supplied to the semiconductor laser (i.e., the output laser beam can directly be modulated by an analog modulating signal). Therefore, it is not necessary to employ an optical modulator such as an acoustooptic modulator (AOM), or the like, separately from the semiconductor laser, and also to move the AOM into and out of the beam path of the semiconductor laser depending on whether the laser beam is to be modulated or not.

However, the semiconductor lasers available today have certain limitations. If a semiconductor laser is to be continuously energized, its continued output is relatively small, ranging from only 20 to 30 mW. Such a semiconductor laser cannot be used as a light source in the image reading device which requires a high-energy scanning light beam.

One solution is to combine the output laser beams emitted by a plurality of semiconductor lasers into a single laser beam with a high level of energy which can be used as a scanning laser beam. To generate such a composite laser beam, the laser beams generated by the respective semiconductor lasers are converted into parallel beams by respective collimator lenses, and then guided into close, parallel light paths along which the laser beams are applied to a light deflector.

The scanning device further includes, in addition to the light source and the optical system associated therewith, a synchronizing light source for generating a beam which synchronizes with scanning cycles over the sheet of the scanning laser beam in the main scanning direction so that the scanned spot on the sheet can be known, a synchronizing beam detector for detecting the synchronizing beam, and a synchronizing optical system for guiding the synchronizing beam from the synchronizing light source to the synchronizing beam detector. Since the synchronizing beam is used only to generate a synchronizing signal, the intensity of the synchronizing beam is low enough to be detectable by only the synchronizing beam detector. Therefore the synchronizing beam may be a laser beam generated by a single semiconductor laser, for example.

Consequently, one proposed scanning device may include a composite light source unit comprising a number of semiconductor lasers for emitting respective laser beams which are combined into a scanning beam, and a synchronizing beam light source comprising a single semiconductor laser. The scanning devices has a scanning system which includes the composite light source unit, a scanning optical system for guiding the scanning beam emitted from the composite light source unit onto the sheet, and a synchronizing system which includes the synchronizing beam light source, a synchronizing optical system, and a synchronizing beam detector. The scanning and synchronizing systems are primarily separate from each other except for a mechanical light deflector such as a rotating polygon and some optical system components which are shared by these systems.

Though the scanning and synchronizing systems share a rotating polygon and some optical system components, the entire number of parts of the scanning device is large, and the scanning device cannot be reduced in size. Various parts of the scanning device cannot be easily adjusted in order to produce a synchronizing signal which correctly monitors the scanned spot on the sheet. Even after the parts have been properly adjusted, the optical axis of the scanning device tends to become displaced.

SUMMARY OF THE INVENTION

According to a first aspect of the present invention, a composite light source unit comprised a housing, a plurality of semiconductor lasers disposed in the housing, a plurality of collimator optical systems disposed respectively in the paths of laser beams generated respectively from the semiconductor lasers for converting the laser beams to parallel laser beams, respectively, and a combining optical system for combining all the laser beams except a single laser beam as a group of laser beams having close, parallel optical axes, respectively, extending in a direction different from the direction of said single laser beam, whereby said single laser beam and the group of laser beams are emitted from the housing in different directions. One or more of these combined laser beams may be directed to travel along one path.

According to a second aspect of the present invention, a composite light source unit comprises a housing, a plurality of semiconductor lasers disposed in the housing, a plurality of collimator optical systems disposed respectively in the paths of laser beams generated respectively from the semiconductor lasers for converting the laser beams to parallel laser beams, respectively, and a combining optical system for combining the laser beams, which have passed through the respective collimator optical systems, as a group of laser beams having close, parallel optical axes, respectively, and for emitting the group of laser beams out of the housing, the combining optical system being disposed in the housing, one of the laser beams emitted out of the housing having a different optical property than that of the other laser beams.

The composite light according to the present invention means a group of laser beams which can be deflected by a reflecting facet of a light deflector together, or focused into a position by a single scanning lens as if the combined laser beams were a single beam. One or more of these combined laser beams may be directed to travel along one path.

The optical property referred to above may be a wavelength, the direction of linear polarization, or the like.

According to a third aspect of the present invention, a scanning device for scanning a recording sheet is provided with a laser beam in a main scanning direction while the recording sheet is being moved with respect to the laser beam in an auxiliary scanning direction substantially perpendicular to the main scanning direction. The scanning device comprises the composite source unit according to the first aspect of the invention, a mechanical light deflector for simultaneously deflecting said one laser beam and the group of laser beams which are emitted from the composite light beam source. A scanning optical system for enables the group of laser beams deflected by the mechanical light deflector to scan the recording sheet with a beam spot having a constant diameter. A synchronizing beam detector for detecting said one laser beam deflected by the mechanical light deflector generates a signal in synchronism with scanning cycles on the recording sheet of the group of laser beams.

According to a fourth aspect of the present invention, a scanning device for scanning a recording sheet is provided with a laser beam in a main scanning direction while the recording sheet is being moved with respect to the laser beam in an auxiliary scanning direction substantially perpendicular to the main scanning direction. The scanning device comprises the composite source unit according to the second aspect of the invention, a mechanical light deflector for simultaneously deflecting the group of laser beams which is emitted from the composite light beam source, a separator optical system for separating the group of laser beams into said one laser beam and said other laser beams from each other. A scanning optical system enables the other laser beams to scan the recording sheet with a beam spot having a constant diameter. A synchronizing beam detector for detecting said one laser beam deflected by the mechanical light deflector generates a signal in synchronism with scanning cycles on the recording sheet of the other laser beams.

If the scanning devices according to the first and second aspects of the invention are used in an image reading apparatus, then the recording sheet referred to above may comprise a photosensitive film with an image recorded thereon, or a stimulable phosphor sheet with radiation image information recorded thereon, or the like. If the scanning devices are used in an image recording apparatus, then the recording sheet may comprise a photosensitive sheet or the like before an image is recorded thereon.

In the composite light source unit according to the first aspect, since the semiconductor lasers and associated optical devices are mounted fixedly in the housing, they are not subject to large temperature differences, and their optical axes will not be displaced once optical adjustments are made. Inasmuch as the laser beam group and the single laser beam are emitted from the single housing, the composite light source unit is smaller as a whole than it would be if the laser beam group and said one laser beam were emitted from respective light source units. If the laser beam group and the single laser beam were emitted from the housing along parallel optical axes, then the scanning device employing the composite light source unit would require a complex optical system for separating and simultaneously scanning the laser beam group and said single laser beam. Because the laser beam group and said single laser beam are emitted from the housing in different directions, however, the laser beam group and said single laser beam can easily be separated from each other outside of the housing.

With the composite light source unit according to the second aspect, since the semiconductor lasers and associated optical devices are mounted fixedly in the housing, they are not subject to large temperature differences, and their optical axes will not be displaced once optical adjustments are made. Inasmuch as the combined laser beams and the single laser beam, which has a different optical property than that of the combined laser beams, are emitted from the single housing, the composite light source unit is smaller as a whole than would be if the combined laser beams and said single laser beam were emitted from respective light source units. The combined laser beams and said single laser beam can easily be separated from each other outside of the housing since the combined laser beams and said single laser beam have different optical properties.

The scanning devices according to the third and fourth aspects of the invention employ the composite light source units according to the first and second aspects, respectively, of the invention. The scanning and synchronizing systems share a mechanical light deflector, such as a rotating polygon, and the light source unit. Therefore, the scanning devices are small in size and highly reliable.

The above and other objects, features and advantages of the present invention will become more apparent from the following description when taken in conjunction with the accompanying drawings in which preferred embodiments of the present invention are shown by way of illustrative example.

DESCRIPTION OF THE PREFERRED EMBODIMENTS

Figure 2:
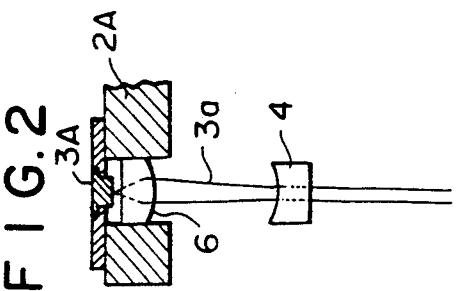
FIG. 2 is a cross sectional view taken along line II—II of FIG. 1.

Like or corresponding parts are denoted by like or corresponding reference numerals throughout views.

Figure 1:
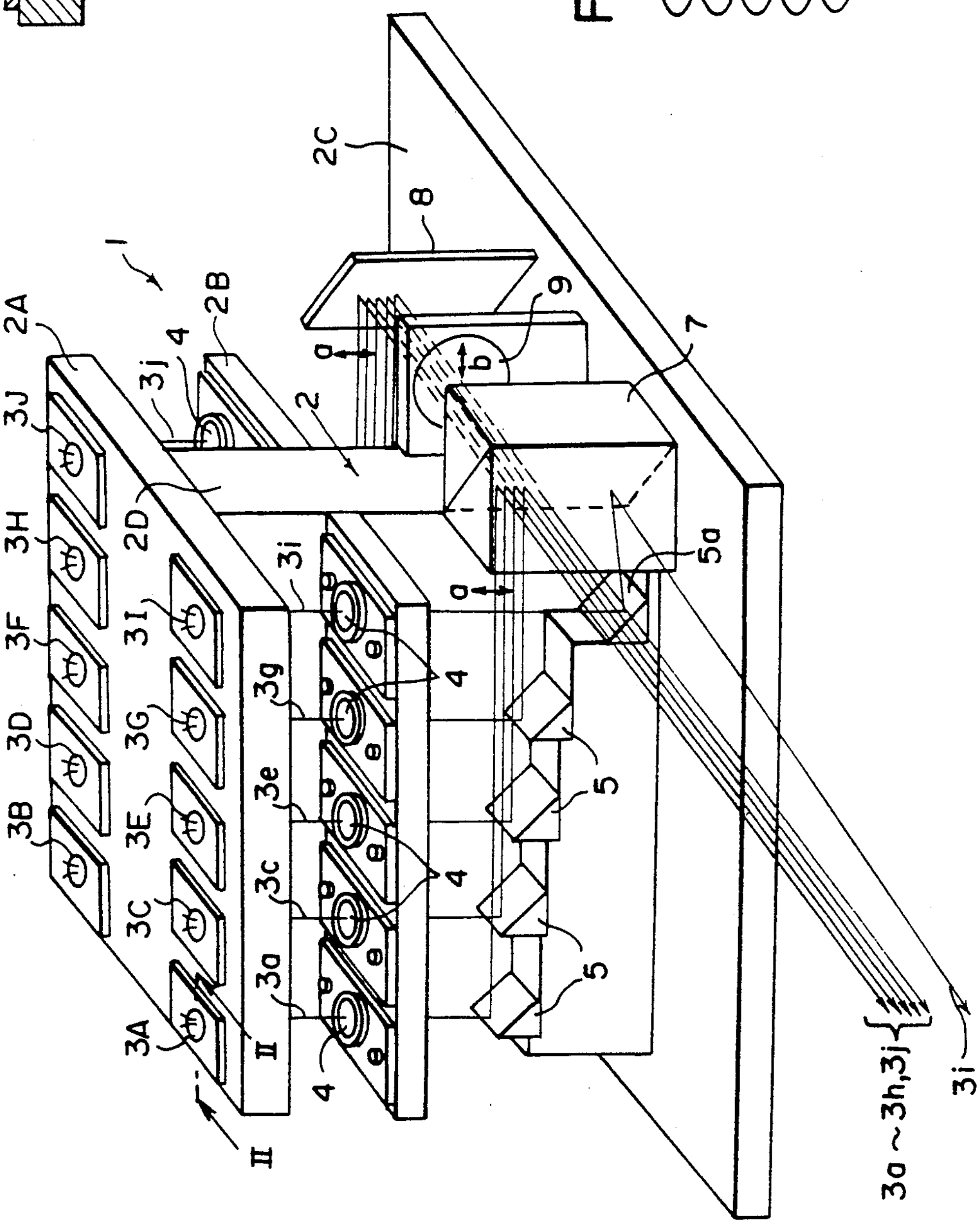
FIG. 1 is a perspective view of a composite light source unit according to an embodiment of the present invention.

FIG. 1 shows a composite light source unit according to an embodiment of the present invention.

The composite light source unit, generally indicated by the reference numeral 1, has a support 2, including an upper panel 2A on which there are fixedly mounted ten semiconductor lasers 3A, 3B, 3C, 3D, 3E, 3F, 3G, 3H, 3I, 3J having parallel axes along which they emit respective laser beams. The support 2 also includes a middle panel 2B supporting ten concave lenses 4 positioned in vertical alignment with the respective semiconductor lasers 3A through 3J, and a lower panel 2C supporting ten prism mirrors 5 serving as light path varying elements and positioned in vertical alignment with the respective semiconductor lasers 3A through 3J. The semiconductor lasers 3A through 3J, the concave lenses 4, and the prism mirrors 5 are arranged symmetrically with respect to a support wall 2D, by which the upper panel 2A, the middle panel 2B, and the lower panel 2C are integrally supported.

Convex lenses 6 (FIG. 2) are disposed in the upper panel 2A in vertical alignment with the semiconductor lasers 3A through 3J, respectively. FIG. 2 shows the convex lens 6 facing the semiconductor laser 3A by way of example. The concave lenses 4 and the convex lenses 6 jointly serve as collimator optical systems. As shown in FIG. 2, a laser beam **3*a* generated by the semiconductor laser 3A passes through the collimator optical system by which the laser beam 3*a* is converted to a parallel laser beam. Likewise, laser beams generated by the other semiconductor lasers 3B through 3J** are converted to parallel laser beams by the respective collimator optical systems, which are disposed on the respective paths of the laser beams.

The parallel laser beams **3*a*, 3*c*, 3*e*, 3*g*, 3*i* are then reflected by the respective prism mirrors 5, 5*a*, disposed below the concave lenses 4 and applied to a polarizing beam splitter 7 mounted on the lower panel 2C. The semiconductor lasers 3A, 3C, 3E, 3G, 3I are arranged on the upper panel 2A on one side of the support wall 2D such that they emit the laser beams 3*a*, 3*c*, 3*e*, 3*g*, 3*i* in one plane. The prism mirrors 5 positioned on the paths of these laser beams, except for the prism mirror 5*a* for reflecting the laser beam 3*i*, are vertically staggered at successively vertically spaced levels, such that the laser beams 3*a*, 3*c*, 3*e*, 3*g*** reflected by these prism mirrors travel along vertically close, parallel paths.

The laser beams **3*b*, 3*d*, 3*f*, 3*h*, 3*j*, emitted from the respective semiconductor lasers 3B, 3D, 3F, 3H, 3J on the other side of the support wall 2D, are reflected by the corresponding prism mirrors 5 and then travel along vertically close, parallel paths. The laser beams 3*a*, 3*b* one on each side of the support wall 2D are reflected at the same height by the corresponding prism mirrors 5. Likewise, the other pairs of laser beams 3*c*, 3*d*, laser beams 3*e*, 3*f*, and laser beams 3*g*, 3*h* are also reflected at the same respective heights by the corresponding pairs of prism mirrors 5. The semiconductor lasers 3A through 3J are fixed to the upper panel 2A such that the laser beams 3*a* through 3*j* reflected by the prism mirrors 5 are polarized in one direction (which is indicated by a in FIG. 1**).

The laser beam **3*j* generated by the semiconductor laser 3J is not reflected at the same height as that at which the laser beam 3*i* is reflected by the corresponding prism mirror 5. More specifically, the prism mirror 5*a* for reflecting the laser beam 3*i* is vertically spaced at a distance from the other prism mirrors 5, and has a mirror surface inclined at an angle different from the angle of the mirror surfaces of the other prism mirrors 5**.

Figure 3:
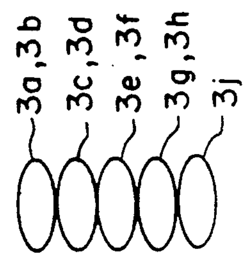
FIG. 3 is a cross-sectional view of laser beams emitted from the composite light source unit shown in FIG. 1.

The polarizing beam splitter 7 reflects light which is polarized in the direction indicated by the arrow a. Therefore, the laser beams **3*a*, 3*c*, 3*e*, 3*g*, 3*i* are reflected by the polarizing beam splitter 7. The laser beams 3*b*, 3*d*, 3*f*, 3*h*, 3*j*, which have been reflected by the corresponding prism mirrors 5, are reflected again by a mirror 8 mounted on the lower panel 3C, so that the paths of these laser beams are angularly deflected through about 90°. The direction in which the laser beams 3*b*, 3*d*, 3*f*, 3*h*, 3*j* are deflected is then deflected 90° by passing through a halfwave plate 9. The laser beams 3*b*, 3*d*, 3*f*, 3*h*, 3*j*, which have passed through the halfwave plate 9, are therefore polarized in the direction indicated by the arrow b. The polarizing beam splitter 7 passes light, which is polarized in the direction indicated by the arrow b. Consequently, the laser beams 3b, 3d, 3f, 3h, 3j, pass through the polarizing beam splitter 7. The laser beam 3b travels along the same path as the laser beam 3a, the laser beam 3d as the laser beam 3c, the laser beam 3f as the laser beam 3e, and the laser beam 3h as the laser beam 3g. The laser beam 3j travels along a path close and parallel to these paths. The nine laser beams 3a through 3h and 3j which thus travel as combined laser beams along the close, parallel paths have cross-sectional shapes as shown in FIG. 3**.

The laser beam 3i is reflected by the prism mirror 5a in a direction different from the direction in which the other laser beams are reflected by the respective prism mirrors 5. Therefore, the laser beam 3i is emitted from the composite light source unit 1 in a different direction from the direction in which the other combined laser beams 3a through 3h and 3j are emitted.

The composite light source unit 1 has a housing 1a (see FIG. 4) enclosing the various components described above and having an opening through which the laser beams 3a through 3j are emitted.

Since the laser beam group (laser beams 3a through 3h and 3j) and the single laser beam 3i are emitted from the single housing 1a, the composite light source unit 1 is smaller as a whole than would be if this laser beam group and the single laser beam were emitted from respective light source units. The optical axes of the laser beam group and single laser beam are less liable to be displaced over a long period of time. Inasmuch as the laser beam group (laser beams 3a through 3h and 3j) and the single laser beam 3j are emitted from the housing 1a in different directions, they can easily be separated from each other after they have been emitted from the housing 1a.

Figure 4:
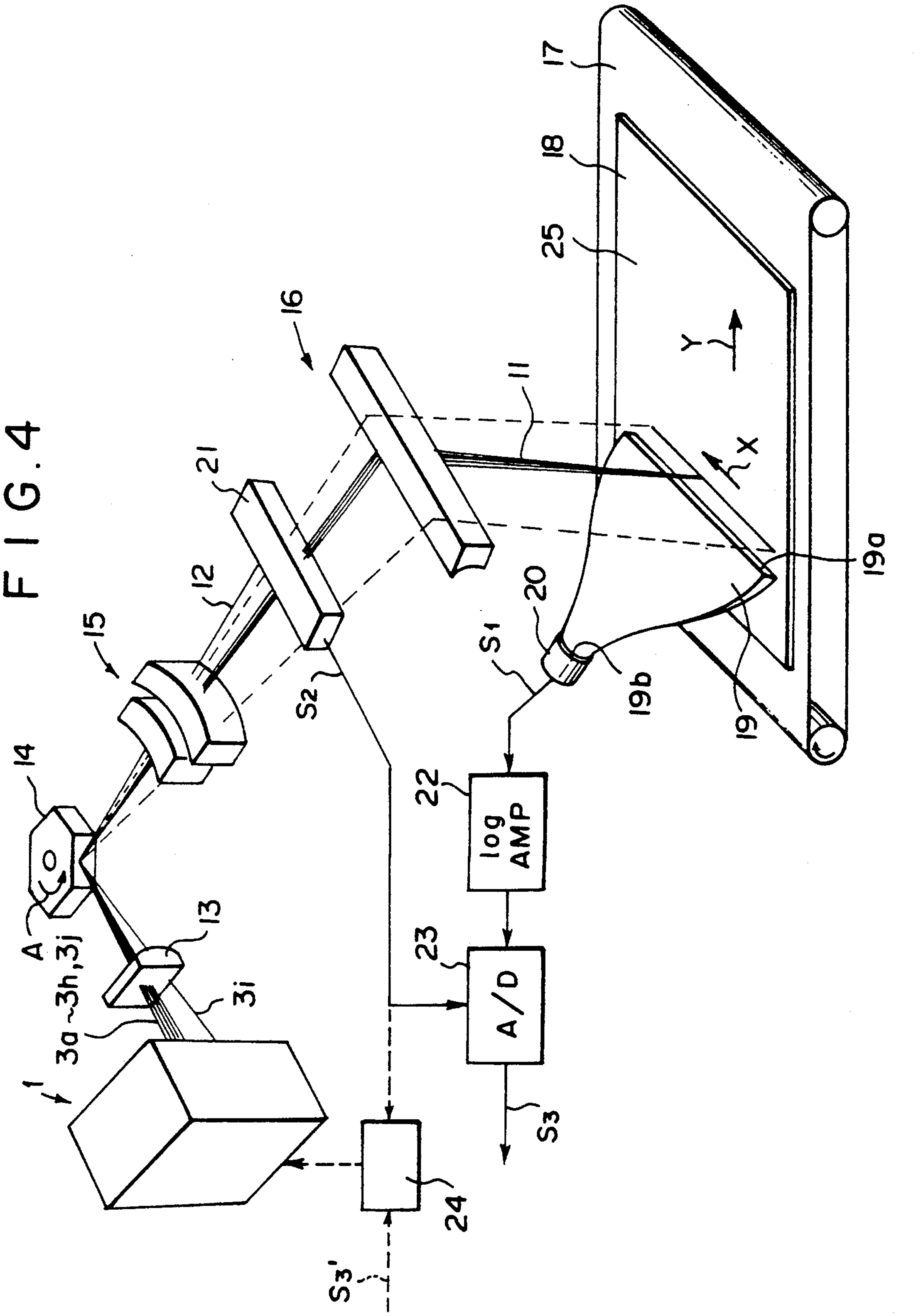
FIG. 4 is a perspective view, partly in block form, of an image reading and recording apparatus incorporating a scanning device according to another embodiment of the present invention.

FIG. 4 shows an image reading and recording apparatus which incorporates a scanning device according to another embodiment of the present invention.

The image reading and recording apparatus, as it is used as an image reading apparatus, will be described below.

The combined laser beams 3a through 3h and 3j, emitted from the composite light source unit 1, are used as a scanning beam 11, whereas the laser beam 3i emitted separately from the combined laser beams 3a through 3h and 3j is used as a synchronizing beam 12.

The scanning beam 11 from the composite light source unit 1 passes through a cylindrical lens 13 and is then reflected and deflected by a rotating polygon 14. The synchronizing beam 12 from the composite light source unit 1 travels below the cylindrical lens 13, and is then reflected and deflected by the rotating polygon 14. The rotating polygon 14 is rotated at a high speed in the direction indicated by the arrow A by a motor (not shown). The deflected scanning beam 11 passes through an fθ lens 15 and is reflected by a cylindrical mirror 16 to repeatedly scan a stimulable phosphor sheet 18 with a radiation image recorded thereon in a main scanning direction indicated by the arrow X. At the same time, the stimulable phosphor sheet 11 is moved in an auxiliary scanning direction indicated by the arrow Y, which is substantially perpendicular to the direction X, by means of a sheet feed means (auxiliary scanning means) comprising an endless belt 17 or the like. Thus, the stimulable phosphor sheet 18 is scanned two-dimentionally by the scanning beam 11. The cylindrical lens 13, the fθ lens 15, and the cylindrical mirror 16 are arranged such that the scanning beam 11 is applied as a spot of a constant diameter to the stimulable phosphor sheet 18, irrespective of the rotation of the rotating polygon 14.

The stimulable phosphor sheet 18, which is scanned by the scanning beam, emits light having an intensity depending on the image information recorded on the sheet 18 at the scanned spot. The emitted light then enters a light guide 19 through an end face 19a thereof, which is positioned near the stimulable phosphor sheet 18, and extends parallel to the main scanning line defined by the scanning beam 11 as it runs on the sheet 18. The end face 19a of the light guide 19 is flat, and the light guide 19 is progressively narrowed toward its cylindrical rear end 19b which is coupled to a photomultiplier or multiplier phototube 20. The emitted light which has entered through the entrance end face 19a is guided toward the rear end 19b, from which the light is applied to the photomultiplier 20 through an optical filter (not shown) which selectively passes the light. The light is then converted to an electric signal (analog image signal) $S_1$ by the photomultiplier 20.

The synchronizing beam 12 deflected by the rotating polygon 14 passes through the fθ lens 15, and is then applied to a synchronizing beam detector 21, which is scanned by the synchronizing beam 12. The synchronizing beam detector 21 generates a synchronizing signal $S_2$ in the form of a train of pulses in synchronism with the scanning cycle of the synchronizing beam 12 on the synchronizing beam detector 21. The position on the stimulable phosphor sheet 18, which is presently scanned by the scanning beam 11, can be known by counting the pulses of the synchronizing signal $S_2$.

The analog image signal $S_1$ produced by the photomultiplier 20 is logarithmically amplified by a logarithmic amplifier 22, and then applied to an A/D converter 23, to which the synchronizing signal $S_2$ is also supplied. The analog signal $S_1$ is sampled at time intervals synchronous with the synchronizing signal $S_2$, and converted to a digital image signal $S_3$. The digital image signal $S_3$ is then fed to an image processor (not shown) by which it is processed into an image signal $S_3'$ that is sent to an image recording apparatus. The image recording apparatus reproduces a visible image based on the processed image signal $S_3'$.

The image reading and recording apparatus shown in FIG. 4, as it is used as an image recording apparatus, will be described below.

The processed image signal $S_3'$ and the synchronizing signal $S_2$ are applied to a semiconductor laser driver 24. The semiconductor laser driver 24 drives the semiconductor lasers 3A through 3H and 3J (see FIG. 1) to modulate the intensity of the scanning beam 11 (laser beams 3a through 3h and 3j) in synchronism with the synchronizing signal $S_2$ so that an image based on the image signal $S_3'$ will be reproduced and recorded on a photosensitive film 25.

The intensity-modulated scanning beam 11, which is emitted from the composite light source unit 1, scans the photosensitive film 25 in the main scanning direction X while the photosensitive film 25 is being moved in the auxiliary scanning direction Y, thereby reproducing and recording the image on the photosensitive film 25. The stimulable phosphor sheet 18 and the photosensitive film 25 are shown as being the same sheet in FIG. 4. The illustrated sheet means the stimulable phosphor sheet 18, when the image reading and recording apparatus is used as an image reading apparatus; while it means the photosensitive film 25, when the image reading and recording apparatus is used as an image recording apparatus.

The scanning device shown in FIG. 4, which incorporates the composite light source unit 1, employs the combined laser beams 3*a* through 3*h* and 3*j* as a scanning beam, and also employs the single laser beam 3*i* as a synchronizing beam. The light source for the scanning beam and the light source for the synchronizing beam are combined as the composite light source unit, i.e., a single light source. The composite light source unit is small in size as it shares the light sources and the optical systems, and is highly reliable since the optical axes are less liable to be displaced over a long period of time.

Figure 5:
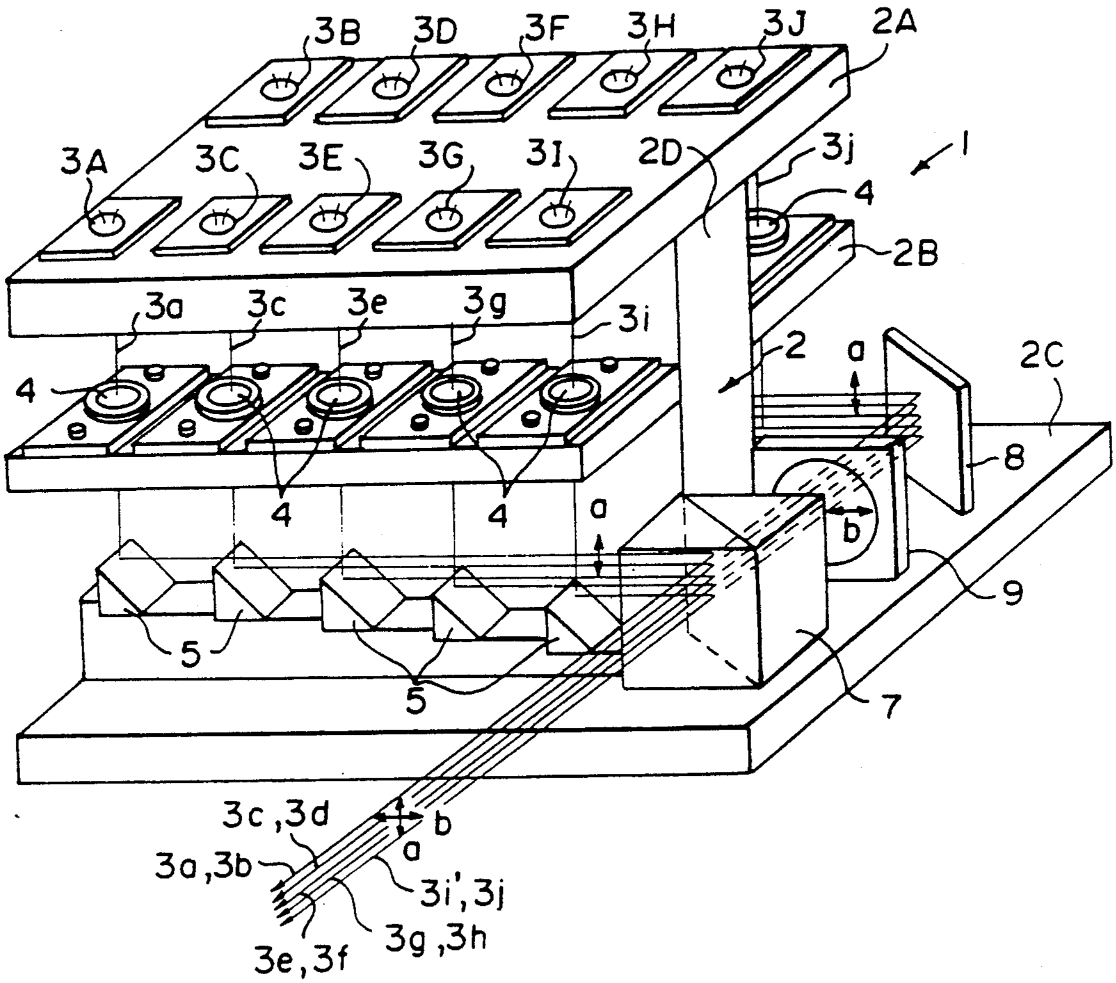
FIG. 5 is a perspective view of a composite light source unit according to still another embodiment of the present invention.
Figure 6:
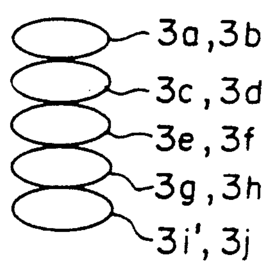
FIG. 6 is a cross-sectional view of laser beams emitted from the composite light source unit shown in FIG. 5.

FIG. 5 shows a composite light source unit according to still another embodiment of the present invention.

The composite light source unit, indicated at 1, is basically of the same construction as the composite light source unit 1 shown in FIG. 1, except as follows: A prism mirror 5, for reflecting a laser beam 3*i'* generated by a semiconductor laser 3I, is arranged such that the laser beam 3*i'* is combined with the other laser beams 3*a* through 3*h* and 3*j*, generated by the respective semiconductor lasers 3A through 3H and 3J, and is emitted in the same direction as these other laser beams. The semiconductor lasers 3A through 3H and 3J generate laser beams having a wavelength of 660 nm, for example, and the semiconductor laser 3I generates a laser beam having a wavelength of 780 nm, for example. This is different from that of the laser beams generated by the semiconductor lasers 3A through 3H and 3J.

The composite light source unit 1 has a housing 1' (see FIG. 7) enclosing the various components described above and having an opening through which the laser beams 3*a* through 3*j* are emitted.

Since the combined laser beams, one of which has a different wavelength from that of the other laser beams, is emitted from the single housing 1', the single laser beam can easily be separated from the other laser beams, and the composite light source unit 1 is smaller as a whole than it would be if the single laser beam and the other laser beams were emitted from respective light source units. The optical axes of the single laser beam and the other laser beams are less liable to be displaced over a long period of time.

Figure 7:
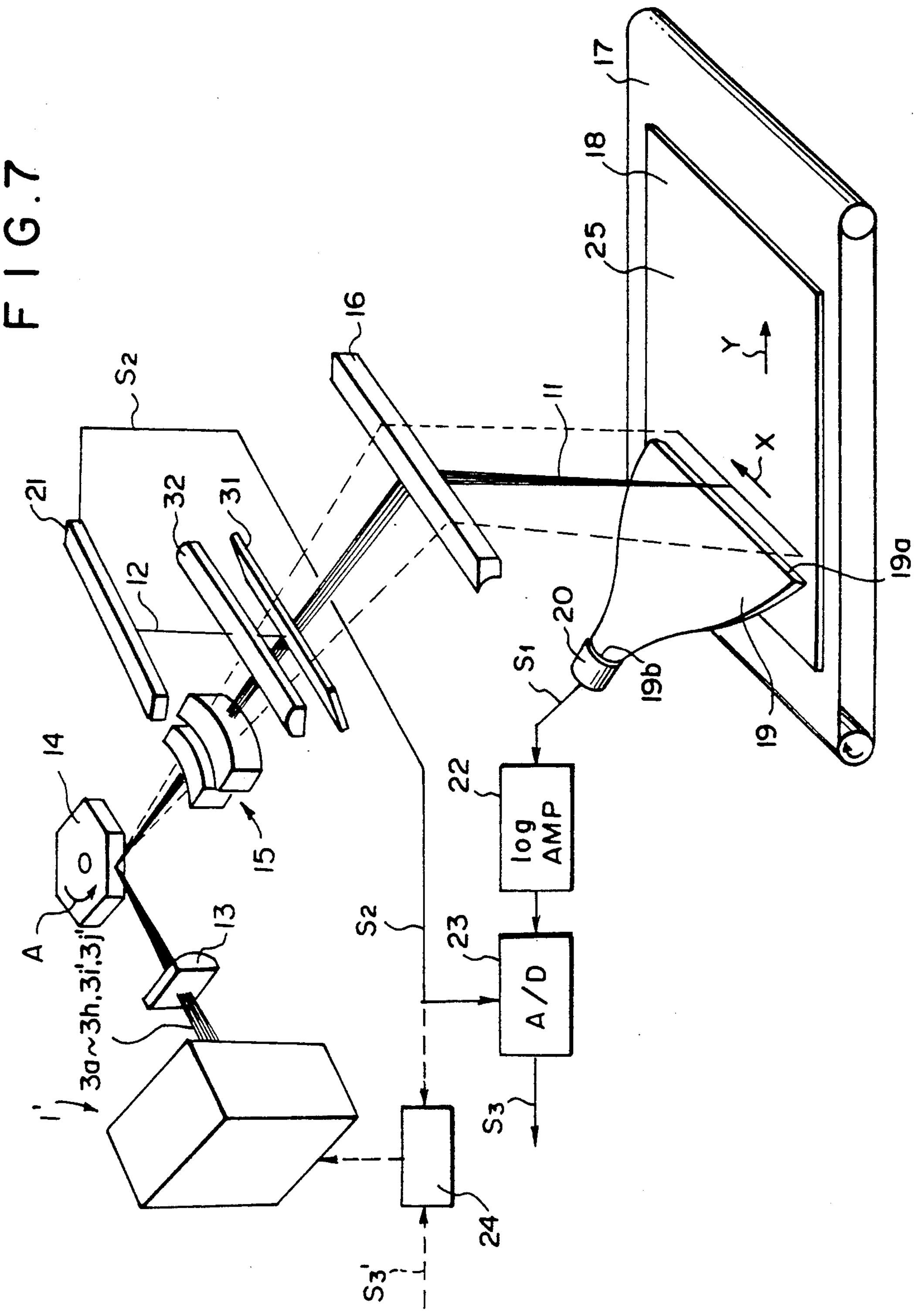
FIG. 7 is a perspective view, partly in block form, of an image reading and recording apparatus incorporating a scanning device according to yet another embodiment of the present invention.

FIG. 7 shows an image reading and recording apparatus which incorporates a scanning device according to yet another embodiment of the present invention.

The combined laser beams 3*a* through 3*h* and 3*j* emitted from the composite light source unit 1 are used as a scalling beam 11, whereas the laser beam 3*i'* having a different wavelength as that of the combined laser beams 3*a* through 3*h* and 3*j* is used as a synchronizing beam 12.

All the laser beams, 3*a* through 3*h*, 3*i'* and 3*j* pass through the cylindrical lens 13. After the laser beams 3*a* through 3*h*, 3*i'* and 3*j* are deflected by the rotating polygon 14 and have passed through the $f\theta$ lens 15, they are applied to a dichroic mirror 31. The dichroic mirror 31 passes through light having a wavelength of 660 nm (i.e., the scanning laser beams 3*a* through 3*h* and 3*j*), but reflects light having a wavelength of 780 nm (i.e., the synchronizing laser beam 3*i'*). The scanning laser beam 11 that has passed through the dichroic mirror 31 scans the stimulable phosphor sheet 13, from which an analog image signal $S_1$ is produced, in the same manner as with the image reading and recording apparatus shown in FIG. 4.

The synchronizing beam 12 which has been reflected by the dichroic mirror 31 passes through a cylindrical lens 32, and is then applied to the synchronizing beam detector 21, which is scanned by the synchronizing beam 12. The synchronizing beam detector 21 generates a synchronizing signal $S_2$ in the form of a train of pulses in synchronism with the scanning cycle of the synchronizing beam 12 on the synchronizing beam detector 21. The synchronizing signal $S_2$ is used in the same manner as the synchronizing signal $S_2$ shown in FIG. 2.

The scanning device shown in FIG. 7, which incorporates the composite light source unit 1, employs the combined laser beams 3*a* through 3*h* and 3*j* as a scanning beam, and also employs the single laser beam 3*i'* as a synchronizing beam, which has a wavelength different from the wavelength of the laser beams 3*a* through 3*h* and 3*j*. The light source for the scanning beam and the light source for the synchronizing beam are combined as the composite light source unit, i.e., a single light source. The composite light source unit is small in size, as it shares light sources and optical systems. It is also highly reliable, since the optical axes are less liable to be displaced over a long period of time.

In the illustrated embodiment, the laser beam 3*i'* can be separated from the laser beams 3*a* through 3*h* and 3*j* by the dichroic mirror 31, since the wavelength of the laser beam 3*i'* is different from that of the laser beams 3*a* through 3*h* and 3*j*. However, another optical property may be relied upon to separate the laser beams.

More specifically, if the semiconductor lasers 3D, 3F, 3H, 3J are removed, then only the laser beam 3*b* which has passed through the halfwave plate 9 is polarized in a direction different from the direction in which the other five laser beams 3*a*, 3*c*, 3*e*, 3*g*, 3*i'* are polarized. If the dichroic mirror 31 is replaced with a polarizing beam splitter in FIG. 7, then the laser beam 3*b* can be separated from the other five laser beams 3*a*, 3*c*, 3*e*, 3*g*, 3*i'* by the polarizing beam splitter. The separated laser beam 3*b* can now be used as a synchronizing beam, and the laser beams 3*a*, 3*c*, 3*e*, 3*g*, 3*i'* as a scanning beam.

The scanning devices illustrated in FIGS. 4, 7 are shown as being incorporated in systems which use a stimulable phosphor sheet. However, the scanning device of the present invention may be incorporated in a system which produces an image signal by scanning an X-ray film on which an image is recorded. The scanning device can also be combined with other systems for processing images, rather than the system for processing radiation images.

The image reading and recording apparatus shown in FIGS. 4 and 7 can both read and record images. The present invention is however also applicable independently to an image reading apparatus which only reads images, and an image recording apparatus which only records images.

With the composite light source unit shown in FIG. 1, a plurality of semiconductor lasers and associated optical systems are disposed in a housing, and a single laser beam and a combined group of laser beams are emitted from the housing in different directions. The composite light source unit is small in size and also highly reliable as the optical axes therein are not easily displaced over a long period of time. The single laser beam can easily be separated from the combined group of laser beams outside of the housing.

With the composite light source unit shown in FIG. 5, a plurality of semiconductor lasers and associated optical systems are disposed in a housing, and a single laser beam, out of a combined group of laser beams which are emitted from the housing, has a different optical property from that of the other laser beams. Accordingly, the single laser beam can easily be separated from the other laser beams. The composite light source unit is small in size and also highly reliable, as the optical axes therein are not easily displaced over a long period of time.

The scanning apparatus shown in FIGS. 4 and 7 incorporate the composite light source units shown in FIGS. 1 and 5, respectively. Each of the scanning apparatus is small in size and reliable in operation because it has a common light source unit for generating scanning and synchronizing beams.

Although certain preferred embodiments have been shown and described, it should be understood that many changes and modifications may be made therein without departing from the scope of the appended claims.

I claim:

1. A composite light source unit comprising:
(i) a housing;
(ii) a plurality of semiconductor lasers disposed in said housing;
(iii) a plurality of collimator optical systems disposed respectively in the paths of laser beams generated respectively from said semiconductor lasers, for converting the laser beams to parallel laser beams, respectively; and
(iv) a combining optical system for combining the laser beams, except a single laser beam, as a group of laser beams having close, parallel optical axes, respectively, extending in a direction different from the direction of said single laser beam, whereby said single laser beam and the group of laser beams are emitted from the housing in different directions.

2. A composite light source unit according to claim 1, wherein said combining optical system comprises a plurality of prism mirrors for reflecting the parallel laser beams from said respective collimator optical systems, one of said prism mirrors having a reflecting surface inclined at a different angle from the angle at which the reflecting surfaces of the other prism mirrors are inclined.

3. A composite light source unit comprising:
(i) a housing;
(ii) a plurality of semiconductor lasers disposed in said housing;
(iii) a plurality of collimator optical systems disposed respectively in the paths of laser beams generated respectively form said semiconductor lasers, for converting the laser beams to parallel laser beams, respectively; and
(iv) a combining optical system for combining the laser beams, which have passed through said respective collimator optical systems, as a group of laser beams having close, parallel optical axes, respectively, and for emitting the group of laser beams out of said housing, said combining optical system being disposed in said housing, one of said laser beams emitted out of the housing having a different optical property than that of the other laser beams.

4. A composite light source unit according to claim 3, wherein said optical property is a wavelength.

5. A composite light source unit according to claim 4, wherein one of said semiconductor lasers generates said one laser beam at a wavelength different from the wavelength of the laser beams generated by the other semiconductor lasers.

6. A composite light source unit according to claim 3, wherein said optical property is a direction of linear polarization.

7. A composite light source unit according to claim 6, wherein said combining optical system includes means for polarizing said one laser beam in a direction different from the direction in which the other laser beams are polarized.

8. A composite light source unit according to claim 7, wherein said means comprises a halfwave plate.

9. A scanning device for scanning a recording sheet with a laser beam in a main scanning direction while the recording sheet is being moved with respect to the laser beam in an auxiliary scanning direction substantially perpendicular to the main scanning direction, said scanning device comprising:
(i) a composite light source unit comprising a housing, a plurality of semiconductor lasers disposed in said housing, a plurality of collimator optical systems disposed respectively in the paths of laser beams generated respectively from said semiconductor lasers for converting the laser beams to parallel laser beams, respectively, and a combining optical system for combining the laser beams, except a single laser beam, as a group of laser beams having close, parallel optical axes, respectively, extending in a direction different from the direction of said single laser beam, whereby said single laser beam and the group of laser beams are emitted from the housing in different directions;
(ii) a mechanical light deflector for simultaneously deflecting said single laser beam and the group of laser beams which are emitted from said composite light beam source;
(iii) a scanning optical system for enabling the group of laser beams deflected by said mechanical light deflector to scan the recording sheet with a beam spot having a constant diameter; and
(iv) a synchronizing beam detector for detecting said single laser beam deflected by said mechanical light deflector to generate a signal in synchronism with scanning cycles on the recording sheet of the group of laser beams.

10. A scanning device according to claim 9, wherein said combining optical system comprises a plurality of prism mirrors for reflecting the parallel laser beams from said respective collimator optical systems, one of said prism mirrors having a reflecting surface inclined at a different angle from the angle at which the reflecting surfaces of the other prism mirrors are inclined.

11. A scanning device for scanning a recording sheet with a laser beam in a main scanning direction while the recording sheet is being moved with respect to the laser beam in an auxiliary scanning direction substantially perpendicular to the main scanning direction, said scanning device comprising:
(i) a composite light source unit comprising a housing, a plurality of semiconductor lasers disposed in said housing, a plurality of collimator optical systems disposed respectively in the paths of laser beams generated respectively from said semiconductor lasers for converting the laser beams to parallel laser beams, respectively, and a combining optical system for combining the laser beams, which have passed through said respective collimator optical systems, as a group of laser beams having close, parallel optical axes, respectively, and for emitting the group of laser beams out of said housing, said combining optical system being disposed in said housing, one of said laser beams emitted out of the housing having a different optical property than that of the other laser beams;

(ii) a mechanical light deflector for simultaneously deflecting the group of laser beams which is emitted from said composite light beam source;

(iii) a separator optical system for separating from each other the group of laser beams into said single laser beam and said other laser beams;

(iv) a scanning optical system for enabling the said other laser beams to scan the recording sheet with a beam spot having a constant diameter; and (v) a synchronizing beam detector for detecting said one laser beam deflected by said mechanical light deflector to generate a signal in synchronism with scanning cycles on the recording sheet of the other laser beams.

12. A scanning device according to claim 11, wherein said optical property is a wavelength.

13. A scanning device according to claim 12, wherein one of said semiconductor lasers generates said single laser beam at a wavelength different from the wavelength of the laser beams generated by the other semiconductor lasers.

14. A scanning device according to claim 11, wherein said optical property is a direction of linear polarization.

15. A scanning device according to claim 14, wherein said combining optical system includes means for polarizing said one laser beam in a direction different from the direction in which the other laser beams are polarized.

16. A scanning device according to claim 15, wherein said means comprises a halfwave plate.

17. A scanning device according to claim 9 or 11, wherein said recording sheet comprises a stimulable phosphor sheet.

18. A scanning device according to claim 9 or 11, wherein said recording sheet comprises a photosensitive film.

19. A composite light source unit comprising:

(i) a housing (ii) a plurality of semiconductor lasers disposed in said housing in a two-dimensional array;

(iii) an equal plurality of collimator optical systems individually disposed in the paths of laser beams generated by said semiconductor lasers, for converting the laser beams to parallel laser beams; and (iv) a combining optical system for combining the laser beams into a group of laser beams having close, parallel optical axes, respectively, said combining optical system maintaining one of said plurality of semiconductor lasers as a separate single laser beam, said group of laser beams extending in a direction different from the direction of said single laser beam, wherein said single laser beam and the group of laser beams are emitted from the housing in different directions, said combining optical system comprising:

a plurality of mirrors for reflecting the laser beams, said plurality of mirrors having a step-wise orientation such that beams reflected therefrom, travel in nonrestricted parallel paths.

20. A composite light source unit according to claim 1, said plurality of mirrors being prism mirrors and reflecting the parallel laser beams from said respective collimator optical systems, one of said prism mirrors having a reflecting surface inclined at a different angle from the angle at which the reflecting surfaces of the other prism mirrors are inclined.

21. A composite light source unit comprising:

(i) a housing;

(ii) a plurality of semiconductor lasers disposed in said housing in a two-dimensional array;

(iii) an equal plurality of collimator optical systems individually disposed in the paths of laser beams generated by said semiconductor lasers, for converting the laser beams to parallel laser beams; and (iv) a combining optical system for combining the laser beams, which have passed through said respective collimator optical systems, into a group of laser beams having close, parallel optical axis, and for emitting the group of laser beams from said housing, said combining optical system being disposed in said housing, one of said laser beams emitted from the housing having a different optical property than that of the other laser beams, said combining optical system comprising:

a plurality of mirrors for reflecting the laser beams, said plurality of mirrors having a step-wise orientation such that beams reflected therefrom, travel in nonrestricted parallel paths.

* * * * *